(12) United States Patent
Kissel

(10) Patent No.: US 7,058,499 B2
(45) Date of Patent: Jun. 6, 2006

(54) BRAKE CONTROL SYSTEM AND METHOD

(75) Inventor: William R. Kissel, Ortonville, MI (US)

(73) Assignee: KDS Controls, Troy, MI (US)

( * ) Notice: Subject to any disclaimer, the term of this patent is extended or adjusted under 35 U.S.C. 154(b) by 0 days.

(21) Appl. No.: 10/828,756

(22) Filed: Apr. 21, 2004

(65) Prior Publication Data

US 2004/0245849 A1    Dec. 9, 2004

Related U.S. Application Data

(60) Provisional application No. 60/471,960, filed on May 20, 2003.

(51) Int. Cl.
*G06F 19/00* (2006.01)
*B60T 8/32* (2006.01)

(52) U.S. Cl. .......................... 701/70; 701/72; 701/79; 303/138; 303/146

(58) Field of Classification Search ................. 701/70, 701/72, 78, 83, 91, 38, 79; 303/7, 20, 124; 188/112 R, 112 A; 280/5.502, 5.507, 423.1, 280/428
See application file for complete search history.

(56) References Cited

U.S. PATENT DOCUMENTS

| 6,002,975 | A * | 12/1999 | Schiffmann et al. | 701/36 |
|---|---|---|---|---|
| 6,205,401 | B1 * | 3/2001 | Pickhard et al. | 701/220 |
| 6,308,134 | B1 * | 10/2001 | Croyle et al. | 701/220 |
| 6,421,622 | B1 * | 7/2002 | Horton et al. | 702/95 |
| 6,874,602 | B1 * | 4/2005 | Greaves, Jr. | 188/112 R |
| 2002/0092188 | A1 * | 7/2002 | Smith | 33/356 |

* cited by examiner

*Primary Examiner*—Tan Q. Nguyen
(74) *Attorney, Agent, or Firm*—Howard & Howard

(57) ABSTRACT

A system and method establishes an acceleration of a vehicle which may be used to control a brake system of a towed vehicle towed by a towing vehicle. The system and method establish a gravity vector representing acceleration due to gravity, measure acceleration of the vehicle in a first direction and responsively establish a first acceleration value, measure acceleration of the vehicle in a second direction and responsively establish a second acceleration value, and establish a magnitude of the acceleration of the vehicle in a plane orthogonal to the gravity vector as a function of the gravity vector and the first and second acceleration values.

36 Claims, 5 Drawing Sheets

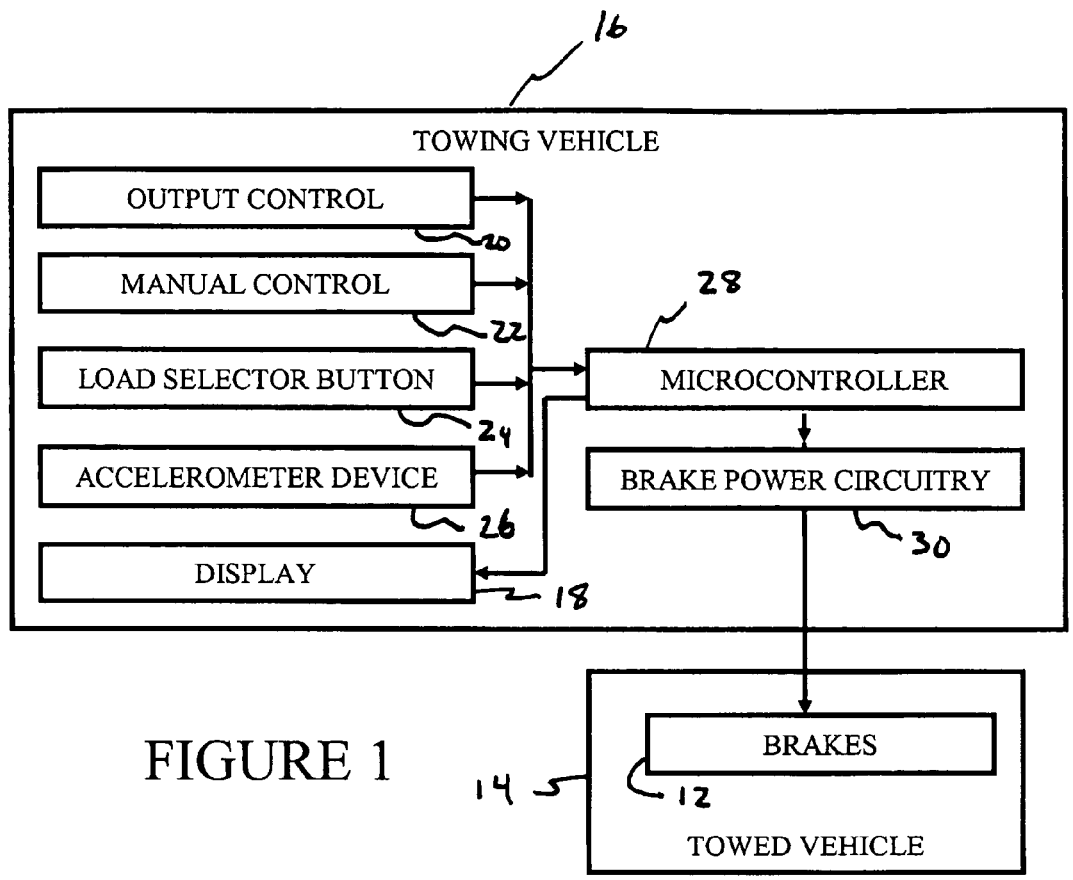
FIGURE 1
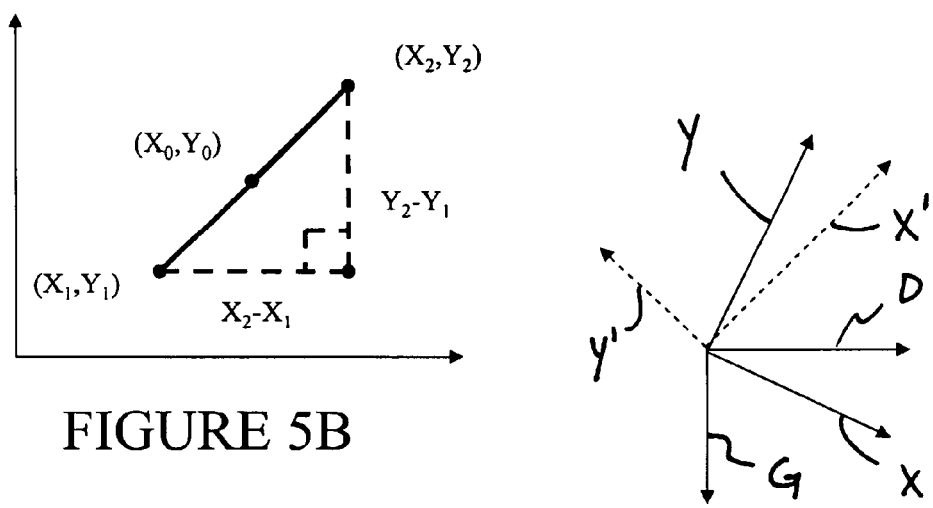
FIGURE 5B
FIGURE 5A

BRAKE CONTROL SYSTEM AND METHOD

CROSS REFERENCE TO RELATED APPLICATIONS

The present application claims priority to U.S. Provisional Patent Application Ser. No. 60/471,960, filed on May 20, 2003.

FIELD OF THE INVENTION

The present invention relates generally to a brakes, and more particularly, to a brake control system and method for actuating the brakes of a towed vehicle.

BACKGROUND OF THE INVENTION

Trailer braking systems typically include a towing vehicle and towed vehicle. Application of the brakes of the towing vehicle generally occur through operator actuation of a brake pedal. It is usually desirable to apply the brakes of the towed vehicle in roughly the same proportion as the brakes of the towing vehicle are applied. Thus, the more forcefully the brakes of the towing vehicle are applied, the more forcefully those of the towed vehicle should be applied.

Where the brakes of the towed vehicle are electrically operated, the performance of the system may suffer from the lack of readily available electrical signal or data indicating the braking force applied by the brakes of the towing vehicle.

One type of system avoids the need for quantitative braking information by applying the towed vehicle brakes in a steadily increasing manner, up to a maximum value, each time the brakes of the towing vehicle are applied. However, this type of system requires proper calibration on the vehicle and skilled operation by the driver of the towing vehicle. Furthermore, the heavier the trailer, the more desirable it becomes to have the proportion of trailer application follow the proportion of towed vehicle brake application.

Other systems utilize one or more sensors which are used to measure the application force applied by the brakes of the towing vehicle. However, these types of systems are costly, due to the cost of the sensors, and require modification of the towing vehicle's safety critical braking system.

Another solution utilizes an accelerometer, such as a mercury switch, pendulum, or other acceleration sensitive mechanical device within the towing vehicle controller, to indirectly measure the brake application force by measuring or responding to the apparent deceleration of the towing vehicle.

One such system is disclosed U.S. Pat. No. 6,445,993 issued to. Larry Eccleston on Sep. 3, 2002. as indication of the braking of the towing vehicle. The Eccleston system uses an accelerometer mounted directly to a printed circuit board. The PC board is mounted in a device which is mounted within the cab of the towing vehicle. Mounting of the device is restricted to a prescribed range of angular positions. Not only does the device fail to function outside of that range, its operation degrades at a steadily increasing rate as its position departs from the center of that range, i.e., it becomes less and less sensitive to decelerations and more and more sensitive to bumps in the road.

The present invention is aimed at one or more of the problems set forth above.

SUMMARY OF THE INVENTION

In a first aspect of the present invention, a method for establishing an acceleration of a vehicle is provided. The method includes the steps of establishing a gravity vector representing acceleration due to force of gravity, measuring acceleration of the vehicle in a first direction and establishing a first acceleration value, measuring acceleration of the vehicle in a second direction and establishing a second acceleration value, and establishing a magnitude of a horizontal component of the acceleration of the vehicle as a function of the gravity vector and the first and second acceleration values.

In a second aspect of the present invention, a system for establishing an acceleration of a vehicle is provided. The system includes an accelerometer device and a controller. The accelerometer device measures acceleration of the vehicle in a first direction and responsively establishes a first acceleration value and measures acceleration of the vehicle in a second direction and responsively establishes a second acceleration value. The controller establishes a gravity vector representing acceleration due to force of gravity and establishes a magnitude of a horizontal component of the acceleration of the vehicle as a function of the gravity vector and the first and second acceleration values.

In a third aspect of the present invention, a method for controlling a brake mechanism of a towed vehicle towed by a towing vehicle is provided. The method includes the steps of establishing a gravity vector representing acceleration due to force of gravity, measuring acceleration of the towing vehicle in a first direction and establishing a first acceleration value, measuring acceleration of the towing vehicle in a second direction and establishing a second acceleration value, establishing a magnitude of a horizontal component of the acceleration of the towing vehicle as a function of the gravity vector and the first and second acceleration values, and controlling the brake mechanism of the towed vehicle as a function of the magnitude of the acceleration of the towing vehicle.

In a fourth aspect of the present invention, a system for controlling a brake mechanism of a towed vehicle towed by a towing vehicle is provided. The system includes an accelerometer device and a controller. The accelerometer device measures acceleration of the towing vehicle in a first direction and responsively establishing a first acceleration value and for measuring acceleration of the towing vehicle in a second direction and responsively establishing a second acceleration value. The controller establishes a gravity vector representing acceleration due to force of gravity, establishes a magnitude of a horizontal component of the acceleration of the towing vehicle as a function of the gravity vector and the first and second acceleration values, and controls the brake mechanism of the towed vehicle as a function of the magnitude of the acceleration of the towing vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a block diagram of a braking controller or system for controlling the brakes of a towed vehicle towed by a towing vehicle, according to an embodiment of the present invention;

FIG. 5A is a graph illustrating operation of the present invention;

FIG. 5B is a diagrammatic illustration of the calibration routine of FIG. 4;

DETAILED DESCRIPTION OF INVENTION

Figure 2:
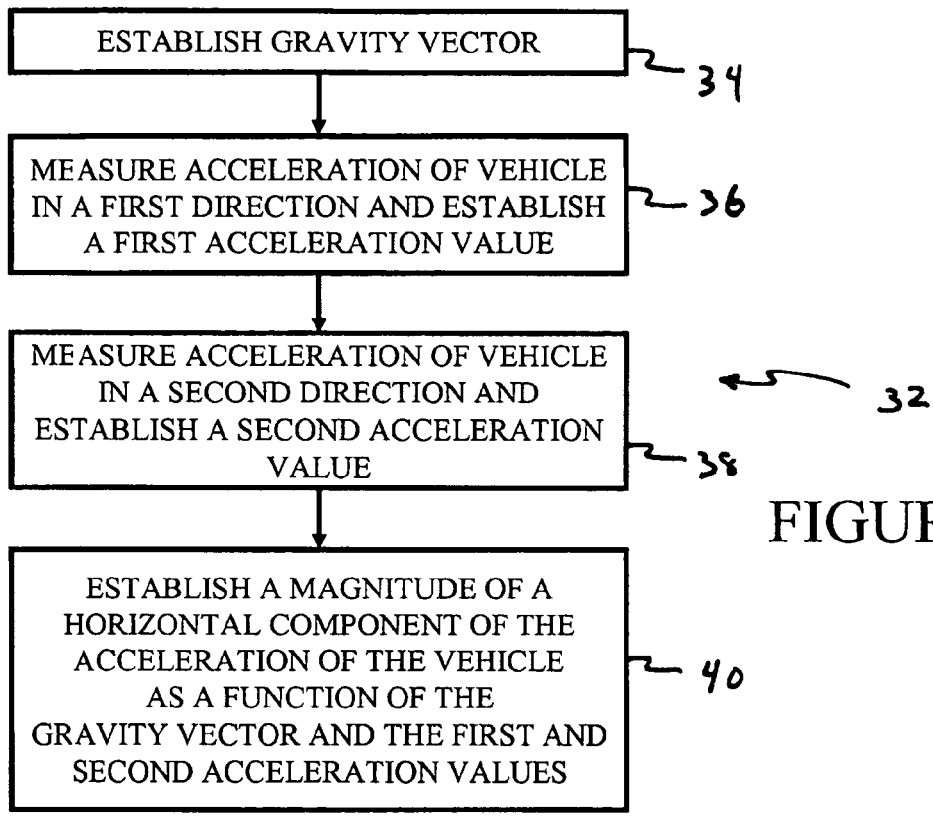
FIG. 2 is a flow diagram of a method for establishing acceleration of a vehicle, according to an embodiment of the present invention.

With reference to the drawings and in operating, the present invention provides a system or brake controller 10 and method for controlling a brake or brakes 12 of a towed vehicle 14 being towed by a towing vehicle 16.

In one aspect of the present invention, the brake controller 10 operates at any mounting angle and responds to longitudinal deceleration of the towing vehicle 16, while ignoring lateral and vertical acceleration (see below). The brake controller 10 operates at any mounting angle about the lateral axis of the towing vehicle 16. For example, it can be mounted under the dashboard of the towing vehicle 16 at around 45 degrees, above the windshield does at 45 degrees, vertically to the front of the operator's seat, behind the operator's head (facing opposite the usual direction, or any other location/mounting angle.

In another aspect of the present invention, the brake controller 10 may calculate the horizontal component of braking deceleration without degradation and control the brake(s) of the towed vehicle, accordingly. The brake controller 10 will also substantially ignore the vertical component of acceleration, e.g., due to bumps, washboard pavement, etc. . . . , and not let these conditions cause transients or oscillations in the power applied to the brake 12.

Specifically, as described below, the brake controller 10 is located in the towing vehicle 16 and automatically determines the direction in which vehicle deceleration (of the towing vehicle) occurs. Additionally, the brake controller 10 may automatically invert a display 18 to allow for inversion of the brake controller 10 from a normal vertical orientation. The brake controller 10 operates independent of the angle at which the controller 10 is mounted, calculates an instantaneous vehicle acceleration and is relatively immune to acceleration due to the vehicle 16 hitting bumps in the road.

In the illustrated embodiment, the brake controller 10 includes an output control 20, a manual control portion 22, a load selector button 24, an accelerometer device 26, a microcontroller 28, and brake power circuitry 30. The microcontroller 28 receives information from the output control 20, manual control portion 22, the load selector button 24, and the accelerometer device 26 and automatically controls actuation of the brakes 12 of the towed vehicle 14 in accordance with a computer program or software program stored in a memory (not shown).

The output control 20 allows an operator to set a gain control for the controller 10. In one aspect of the present invention, the gain control is based on the relative size or weight of the towing and/or towing vehicle 14, 16.

The manual control portion 22 allows an operator to manually control operation of the brakes 12 of the towed vehicle 14. Typically, the manual control portion 20 may include a thumb control, such as a potentiometer, which may be actuated by the thumb of the operator. In one embodiment manual control overrides automatic control.

In one aspect of the present invention, the accelerometer device 26 is a two-axis accelerometer having two voltage or pulse width outputs responsive to acceleration in x and y directions. In one embodiment, the accelerometer device 26 is a two-axis device which consists of an integrated circuit that contains both X and Y accelerometer functions. The X and Y directions are perpendicular and lie in the mounting plane of the integrated circuit. The mounting plane may be coplanar with a plane defined by the longitudinal and vertical axes of the towing vehicle 16.

In one aspect of the present invention, the brake controller 10 maintains time weighted averages of the outputs of the accelerometer device 26 outputs during periods when the brakes of the towing vehicle 16 are not being applied (see below). During these time periods, the primary input to accelerometer device 26 is force of gravity and, thus, the time weighted averages of the outputs of the accelerometer device 26 represent the acceleration of the device 26 due solely from force of gravity. The time weighted averages of the outputs of the accelerometer device 26 define a gravity vector, G.

With reference to FIG. 5A, as discussed above, the controller 10 determines the gravity vector, G, and the acceleration vector, D, independent of the mounting angle of the controller 10, and thus, the accelerometer device 26. D is in a plane orthogonal to G. The X and Y axis of the accelerometer device 26 may be rotated from D at an angle, θ, at an angle θ' (as shown in dashed lined) or at any angle.

The microcontroller 28 may implement a software filter with a predetermined time constant, e.g., 4 milliseconds, to reduce the effect of vibrations on the accelerometer device 24.

In one embodiment, the controller 10 drives the brakes 12 of the towed vehicle 14 with a pulse-width modulated (PWM) signal to establish a braking force in proportion to the braking force applied by the brakes of the towing vehicle 16. In one embodiment, the PWM has a frequency of 250 Hz. The duty cycle of the PWM signal determines the braking force.

In the case of manual control, the controller 10 again drives the brakes 12 with a 250 Hz PWM signal. The duty cycle of the PWM signal is determined by the position of the manual control portion 22. The maximum duty cycle of the PWM signal is limited by the maximum setting of output control 20.

In one embodiment, the display 18 includes a two digit LED which displays the duty cycle in percent, resolution one percent, being applied to the brakes 12.

In one embodiment of the present invention, the gravity vector, G, is used to establish an acceleration vector representing the instantaneous acceleration of the towing vehicle 16 due to braking of the towing vehicle 16. This instantaneous acceleration may then be used to control the actuation of the brakes 12 of the towed vehicle 14.

With specific reference to FIG. 2, in one aspect of the present invention a method 32 for establishing an acceleration of a vehicle 16 is provided. In a first step 34, the method 32 establishes a gravity vector (G) which represents acceleration due to force of gravity. In one embodiment, the gravity vector is based on a series of samples filtered using a low pass filter with a predetermined time constant (see below). In a second step 36, the acceleration of the vehicle 16 in a first direction is measured and a first acceleration value is established. In a third step 38, the acceleration of the vehicle 16 in a second direction is measured and a second acceleration value is established. In a fourth step 40, a magnitude of a horizontal component of the acceleration of the vehicle 16 is established as a function of the gravity vector and the first and second acceleration values. In one embodiment, the horizontal component of the acceleration of the vehicle 16 is in a plane orthogonal to the gravity vector.

Figure 3:
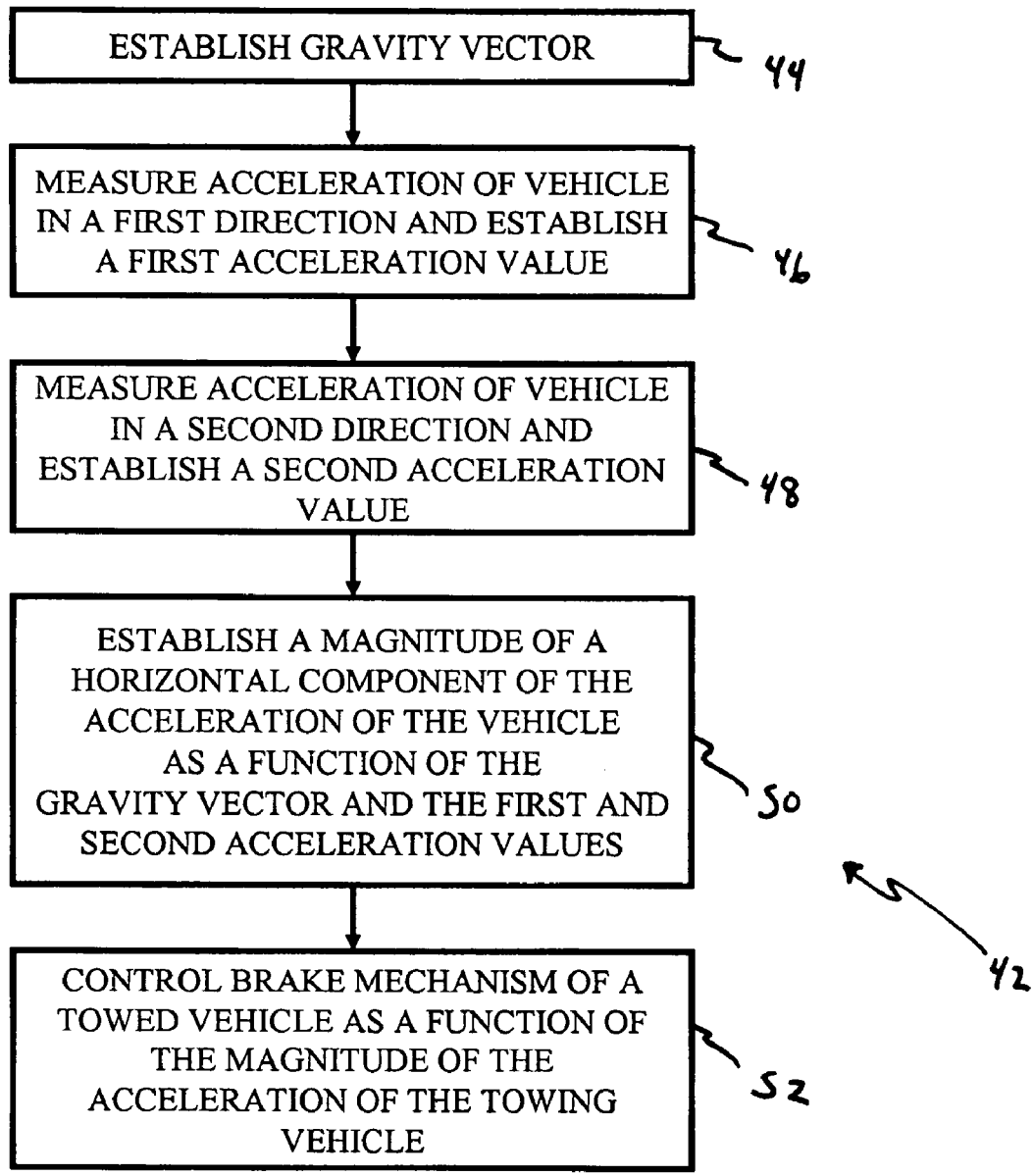
FIG. 3 is a flow diagram of a method for controlling the brakes of a towed vehicle towed by a towing vehicle, according to an embodiment of the present invention.

With specific reference to FIG. 3, in one aspect of the present invention a method 42 for controlling a brake or brake mechanism 12 of a towed vehicle 14 towed by a towing vehicle 16 is provided. In a first step 44, the method 26 establishes a gravity vector (G) which represents acceleration due to force of gravity.

In a second step 46, the acceleration of the vehicle 16 in a first direction is measured and a first acceleration value is established. In a third step 48, the acceleration of the vehicle 16 in a second direction is measured and a second acceleration value is established. In a fourth step 50, a magnitude of a horizontal component of the acceleration of the vehicle 16 is established as a function of the gravity vector and the first and second acceleration values. In one embodiment, the horizontal component of the acceleration of the vehicle 16 is in a plane orthogonal to the gravity vector. In a fifth step 52, the brake mechanism 12 of the towed vehicle 14 is controlled as a function of the magnitude of the acceleration of the vehicle 16. In one embodiment of the present invention, the brake mechanism 12 is controlled to provide a brake force generally in proportion to the brake force applied by the brakes of the towing vehicle 16.

In one embodiment of the present invention, offsets may be applied to the actual outputs (voltage or pulse width) of the accelerometer device 26 to produce offset-corrected outputs having zero values at zero acceleration. Because of the large variability in the required offsets between accelerometer devices, the offsets may be determined for each accelerometer device (using a calibration routine), which may be run once, during manufacture or at the factory, or periodically. For example, the output of an accelerometer may vary between 0 volts and 5 volts. Ideally, a 2.5 volt output would represent no acceleration, a 0 volt output would represent about −2G of deceleration, and a +5.0 volt output would represent about +2G of acceleration. However, due to manufacturing tolerances, a specific accelerometer may exhibit a great deal of voltage variation at no acceleration.

Figure 4:
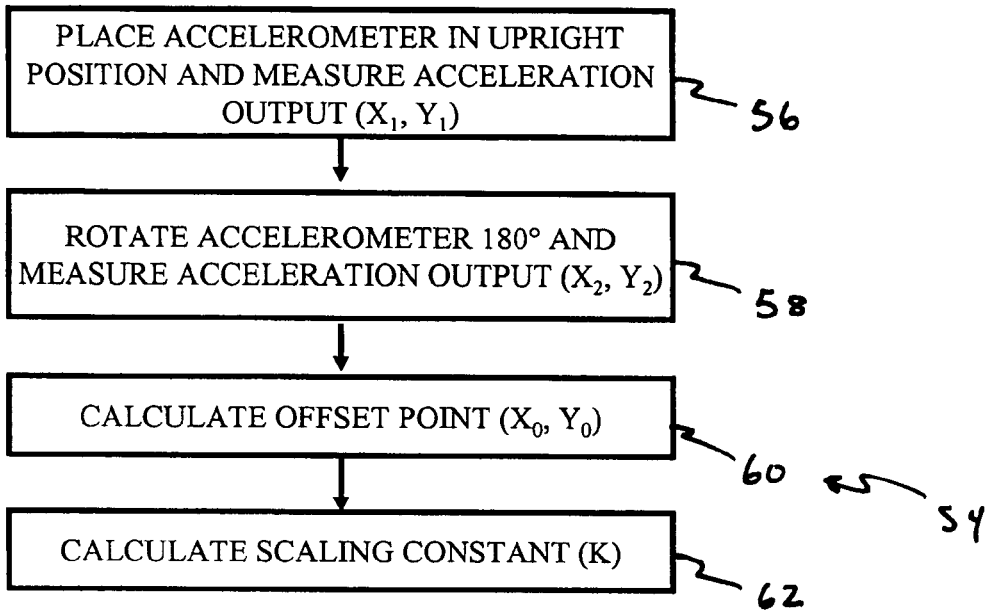
FIG. 4 is a flow diagram of a calibration for an accelerometer device, according to an embodiment of the present invention.

With reference to FIGS. 4 and 5B, a calibration routine 54, according to an embodiment of the present invention is illustrated. The calibration routine 54 takes into account that an accelerometer device will measure the acceleration due to the force of gravity, i.e., 1G, even when the accelerometer is at rest. In a first step 56, the accelerometer device 24 is placed in an upright position and acceleration in the X and Y directions $(X_1, Y_1)$ is measured (see FIG. 5B). In a second step 58, the accelerometer device 24 is then rotated 180 degrees (in the same plane defined by X and Y) and acceleration in the X and Y directions is again measured $(X_2,$ $Y_2,)$. In a third step 60, an offset point $(X_0, Y_0,)$ is calculated using the following equations;

$$X_0=(X_1+X_2)/2, \text{ and}$$

$$Y_0=(Y_1+Y_2)/2.$$

The established offsets, $X_0$ and $Y_0$, may be applied to all readings from the accelerometer device 24.

In one embodiment, controller 10 may calculate a scaling factor as a function of the first and second signals read when the accelerometer device 24 is in the first position and the first and second signals read when the accelerometer device 24 is in the second position (in a fourth step 62).

Since the line segment defined by $(X_2, Y_2,)$ and $(X_1, Y_1,)$ is determined at 180 degrees it represents about 2G's (see FIG. 5B). Thus, a scaling factor, K, may be determined which converts accelerometer output to whatever units are desired. In one embodiment, K may convert the accelerometer output to G units and may be determined by:

$$K=G^2=((X_2-X_1)^2+(Y_2-Y_1)^2)/4.$$

As discussed above, in one aspect of the present invention, a vector, G, is established which represents the magnitude and direction of vehicle acceleration due to gravity. The gravity vector is independent of how the accelerometer device 24 is mounted in the towing vehicle 16. Therefore, no calibrations are necessary when the controller 10 is mounted in the vehicle 16. The controller 10 may be mounted at any angle, even upside down, and the gravity vector provides a constant reference. The magnitude of true acceleration of the vehicle 16 may then be determined (see below).

Figure 6:
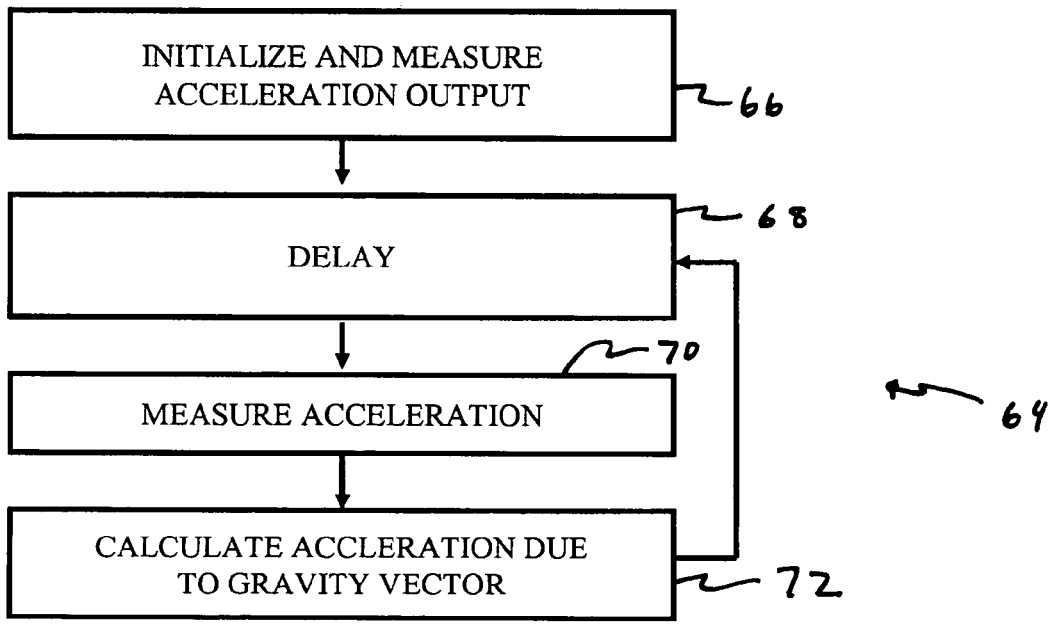
FIG. 6 is a flow diagram of a method for establishing a gravity vector, according to an embodiment of the present invention.

With reference to FIG. 6, in one embodiment of the present invention, a method 64 for establishing the gravity vector, G, is shown. In one aspect of the present invention, the method 64 is performed at times only when the brakes of the towing vehicle 16 are not being applied and the primary factor in the output of the accelerometer device 24 is gravity. In a first step 66, the accelerometer device 24 is initialized and acceleration output is read. In a second step 68, a pre-determined time delay occurs. In a third step 70, acceleration readings are taken. In a fourth step 72, the gravity vector, G, is calculated as a function of a previous vector, $G_{old}$, and the acceleration readings. As long as the conditions described above are met, the process is continuously repeated.

In one embodiment, G, includes a X component (along a horizontal axis), $G_X$, and a Y component (along a vertical axis), $G_Y$, which may be determined by:

$$G_X=(1-(1/A))\cdot G_{OLD\_X}+(x/A), \text{ and}$$

$$G_Y=(1-(1/A))\cdot G_{OLD\_Y}+(y/A),$$

where $G_X$ is the first component of the new gravity vector, A is a predetermined constant, $G_{OLD\_X}$ is a component of the previous gravity vector, $G_Y$ is the second component of the new gravity vector, $G_{OLD\_Y}$ is a second component of the previous gravity vector, and x and y are the measured accelerations along the horizontal axis and the vertical axis, respectively.

In one embodiment, A=1024.

The delay is chosen such that new acceleration readings are taken every predetermined time period. For example, new acceleration readings may be taken about every 4 milliseconds. In one embodiment, new acceleration readings are taken every 4.08 milliseconds.

In one embodiment, the offset values and the calculated gravity vector, G, are used to determine an instantaneous vehicle acceleration, D. Instant vehicle acceleration (D) is the magnitude of the measured acceleration orthogonal to the gravity vector, G.

Figure 7:
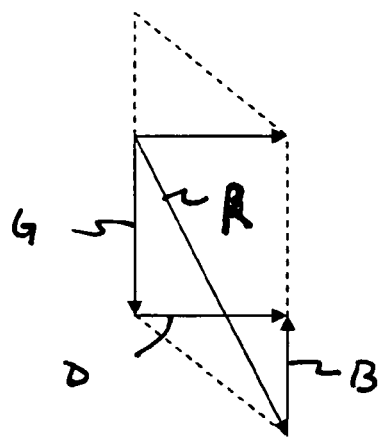
FIG. 7 is a diagrammatic illustration of the vectors used in determining acceleration of a vehicle as a function of a gravity vector, according to an embodiment of the present invention; and, FIG. 8 is a flow diagram of a method for establishing instantaneous acceleration of a vehicle and controlling the brakes of a towed vehicle, according to an embodiment of the present invention.
Figure 8:
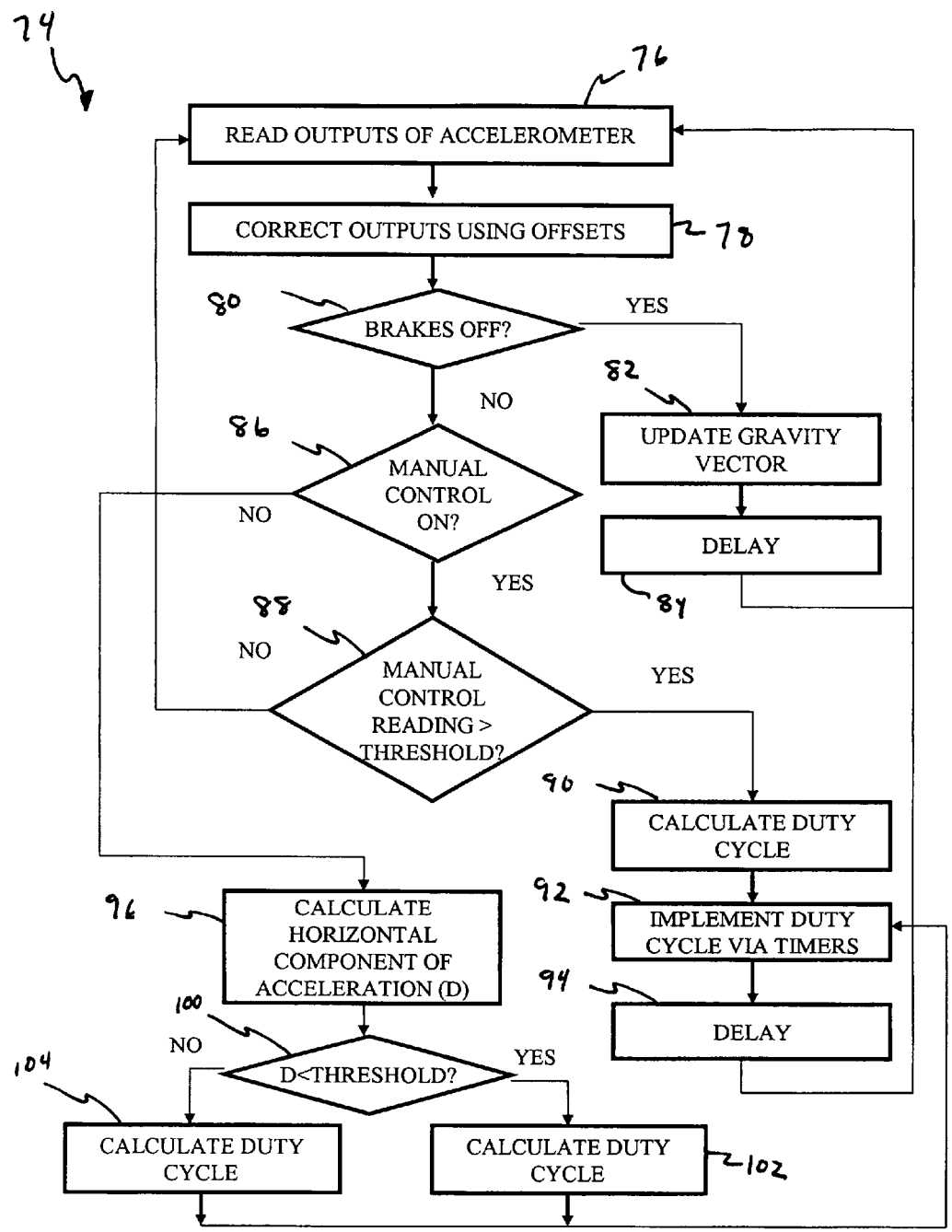

With references to FIGS. 7 and 8, a method 74 for determining instantaneous acceleration of the vehicle 16 is illustrated. In one embodiment of the present invention, the method 74 comprises a loop which is performed once every predetermined loop time. Where appropriate, the method 74 includes a delay to ensure that the loop starts at the next loop time. Although, the term "delay" is used, some functions, such as routine maintenance or diagnostics, may be performed during the "delay".

In a first step 76, the outputs of the accelerometer 26 are read. The offsets (determined using the calibration routine 54) are applied in a second step 78.

In a first decision block 80, if the brakes of the towing vehicle 16 are off, then control proceeds to a third step 82. In one embodiment of the present invention, the controller 10 the brakes of the towing vehicle 16 are off, i.e., not being actuated, if the towing vehicle's 16 stop lamps are off. In the third step 82, the gravity vector, G, is updated (see above). In a fourth step 84, a delay is performed.

In the first decision block 80, if the brakes are not off, then control proceeds to a second decision block 86. In the second decision block 86, if the manual control 22 is "on", indicating operator desires manual control of the brakes 12, then control proceeds to a third decision block 88. In the third decision block 88, if the output of the manual control 22 is over a predetermined threshold, then control proceeds to a fifth step 90. Otherwise the method 74 returns to the first step 76.

In the fifth step 90, a duty cycle of the PWM signal to control the brakes 12 is determined as a function of output of the output control 20 and the manual control 22. In one embodiment of the present invention, the duty cycle of the PWM brake signal is determined using tables stored in memory. A value is returned from the table as a function of the output of the manual control 22. The value is multiplied by the output of the output control 20 to determine the duty cycle. In a sixth step 92, the determined duty cycle is implemented (to control the brakes 12) using a set of software timers. In a seventh step 94, a delay is implemented. Control then returns to the first step 76.

In the second decision block 86, if the manual control is not on, then control proceeds to an eighth step 96.

In the eighth step 96, the magnitude of the horizontal component of the acceleration (D) is calculated (see above).

In fourth decision block 96, if the magnitude of the horizontal component, D, is less than a threshold then control proceeds to a ninth step 102. In one embodiment, the threshold is 0.06 G.

In the ninth step 102, a duty cycle of the PWM signal to control the brakes 12 is determined as a function of output of the output control 20, the setting of the load selector button 24, and the time since the brake event (of the towing vehicle 16). In one embodiment of the present invention, the duty cycle of the PWM brake signal is determined using a second set of tables stored in memory. A value is returned from the table. The value is multiplied by the output of the output control 20 to determine the duty cycle. Control then proceeds to the sixth step 92, during which the determined duty cycle is implemented (to control the brakes 12) using a set of software timers. In the seventh step 94, a delay is implemented. Control then returns to the first step 76.

In the fourth decision block 100, if the magnitude of the horizontal component of the acceleration is not less than the threshold, then control proceeds to a tenth step 104.

In the tenth step 104, a duty cycle of the PWM signal to control the brakes 12 is determined as a function of output of the output control 20, the magnitude of the horizontal component of the acceleration (D), and the setting of the load selector button 24. In one embodiment of the present invention, the duty cycle of the PWM brake signal is determined using a third set of tables stored in memory. A value is returned from the table. The value is multiplied by the output of the output control 20 to determine the duty cycle. Control then proceeds to the sixth step 92, during which the determined duty cycle is implemented (to control the brakes 12) using a set of software timers. In the seventh step 94, a delay is implemented. Control then returns to the first step 76.

With specific reference to FIG. 7, an exemplary illustration of the vectors involved. G represents the gravity vector. R represents the calibrated measured acceleration from the accelerometer device 24. D represents the deceleration of the vehicle 16. B represents the vehicle acceleration dues to variations in the road surface, i.e., bumps.

As shown, the magnitude of D may determined as a function of G and R. In one embodiment, the cross product of G and R represents the area of a parallelogram 78 defined by G and the dashed lines. The magnitude of D (D) is calculated by dividing the area of parallelogram 78 by the magnitude of G (which is 1 G). The outputs of the accelerometer device 24 are expressed in arbitrary units, e.g., volts or a pulse width. Thus, the area of parallelogram 78 divided by G is in the same units. Dividing by 1 G again scales the units to G units. Thus, the magnitude of D in G units may be calculated using:

$$D=|G \times R|/(G^2)=|G \times R|/K.$$

In another aspect of the present invention, the magnitude of D may be calculated using:

$D=|((Y_D \cdot X_G)-(X_D \cdot Y_G)/(G)|$, where D is the magnitude of the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

To express D in G units, the following may be used:

$D=|((Y_D \cdot X_G)-(X_D \cdot Y_G)/(G^2)|$, where D is the magnitude of the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

In another aspect of the present invention, the brake controller 10 may be used to discriminate between braking when the vehicles 14, 16 are going forward or backward. In this aspect, the sign, indicating direction, of D may be used to determine direction.

In one embodiment the controller 10 is turned on or initialized whenever the towing vehicle's stoplamps (brake lights) are actuated, i.e., by application of the brakes of the towing vehicle 16 or activation of the manual control 20. In another aspect of the present invention, the controller 10 includes a method for turning off the brake controller 10 to preserve battery life. The routine only executes when the brakes are applied. The acceleration is periodically sampled. A counter increments each time that the measured acceleration is constant between successive samples. A sample is considered constant if it deviates no more than epsilon from the previous sample. After a total of "Shutdown Limit"

successive samples have no deviation, the brake controller 10 is turned off Additionally, the controller 10 may shut off unconditionally if the brakes are not used after a fixed period of time.

Obviously, many modifications and variations of the present invention are possible in light of the above teachings. The invention may be practiced otherwise than as specifically described within the scope of the appended claims.

What is claimed is:

1. A method for establishing an acceleration of a vehicle, comprising the steps of:
    establishing a gravity vector representing acceleration due to gravity;
    measuring acceleration of the vehicle in a first direction and establishing a first acceleration value;
    measuring acceleration of the vehicle in a second direction and establishing a second acceleration value, the first and second directions being perpendicular; and,
    establishing a magnitude of a horizontal component of the acceleration of the vehicle as a function of the gravity vector and the first and second acceleration values, wherein the step of establishing the first acceleration value includes the step of applying a first offset value and wherein the step of establishing the second acceleration value includes the step of applying a second offset value.

2. A method, as set forth in claim 1, wherein the horizontal component of the acceleration is in a plane defined by the first and second directions.

3. A method, as set forth in claim 1, including the step of establishing the first and second offset values using a calibration routine.

4. A method, as set forth in claim 1, the steps of measuring the acceleration of the vehicle being performed by an accelerometer device, the accelerometer device for providing first and second output signals corresponding to acceleration of the device in first and second accelerometer directions, the first and second accelerometer directions being perpendicular, the calibration routine being performed when the accelerometer device is not moving and including the steps of:
    reading the first and second output signals when the accelerometer device is in a first position;
    rotating the accelerometer device 180 degrees to a second position;
    reading the first and second output signals when the accelerometer device is in the second position; and,
    determining the first and second offset values as a function of the first and second signals read when the accelerometer device is in the first position and the first and second signals read when the accelerometer device is in the second position.

5. A method as set forth in claim 3, the first and second offset values being determined by:

$$X_0 = (X_1 + X_2)/2, \text{ and}$$

$$Y_0 = (Y_1 + Y_2)/2,$$

where $X_0$ is the first offset value, $X_1$ is the first output signal read when the accelerometer device is in the first position, $X_2$ is the first output signal read when the accelerometer device is in the second position, $Y_0$ is the second offset value, $Y_1$ is the second output signal read when the accelerometer device is in the first position, and $Y_2$ is the second output signal read when the accelerometer device is in the second position.

6. A method, as set forth in claim 3, wherein the accelerometer device is a two-axis device which consists of an integrated circuit that contains both x and y accelerometer functions.

7. A method, as set forth in claim 6, where the scaling factor is calculated using:

$$K = ((X_2 - X_1)^2 + (Y_2 - Y_1)^2)/4,$$

where K is the scaling factor, $X_1$ is the first output signal read when the accelerometer device is in the first position, $X_2$ is the first output signal read when the accelerometer device is in the second position, $Y_1$ is the second output signal read when the accelerometer device is in the first position, and $Y_2$ is the second output signal read when the accelerometer device is in the second position.

8. A method, as set forth in claim 6, where the scaling factor is calculated using:
    $K = G^2$, wherein G is the magnitude of the gravity vector.

9. A method, as set forth in claim 3, the calibration routine further including the step of calculating a scaling factor as a function of the first and second signals read when the accelerometer device is in the first position and the first and second signals read when the accelerometer device is in the second position.

10. A method for establishing an acceleration of a vehicle, comprising the steps of:
    establishing a gravity vector representing acceleration due to gravity;
    measuring acceleration of the vehicle in a first direction and establishing a first acceleration value;
    measuring acceleration of the vehicle in a second direction and establishing a second acceleration value, the first and second directions being perpendicular; and,
    establishing a magnitude of a horizontal component of the acceleration of the vehicle as a function of the gravity vector and the first and second acceleration values, wherein the steps of measuring the acceleration of the vehicle being performed by an accelerometer device, the accelerometer device for providing first and second output signals representing acceleration of the device in first and second accelerometer directions, respectively, the first and second accelerometer directions being perpendicular, the step of establishing a gravity vector including the steps of:
    (a) reading the first and second output signals; and,
    (b) determining a new gravity vector as a function of a previous gravity vector the first and second output signals and a low pass filter with a predetermined time constant.

11. A method, as set forth in claim 10, the new gravity vector having first and second components, the first and second components of the new gravity vector determined by:

$$G_X = (1 - (1/A)) \cdot G_{OLD\_X} + (x/A), \text{ and}$$

$$G_Y = (1 - (1/A)) \cdot G_{OLD\_Y} + (y/A),$$

where $G_X$ is the first component of the new gravity vector, A is a predetermined constant, $G_{OLD\_X}$ is a component of the previous gravity vector, $G_Y$ is the second component of the new gravity vector, $G_{OLD_Y}$ is a second component of the previous gravity vector, x is the measured acceleration in the first direction and y is the measured acceleration in the second direction.

12. A method, as set forth in claim 10, the time constant being about 4 milliseconds.

13. A method for establishing an acceleration of a vehicle, comprising the steps of:
   establishing a gravity vector representing acceleration due to gravity;
   measuring acceleration of the vehicle in a first direction and establishing a first acceleration value;
   measuring acceleration of the vehicle in a second direction and establishing a second acceleration value, the first and second directions being perpendicular; and,
   establishing a magnitude of a horizontal component of the acceleration of the vehicle as a function of the gravity vector and the first and second acceleration values,
wherein the horizontal component of the acceleration is determined by:
   $D=|G \times R|/(G)$, where D is the horizontal component of the acceleration, G is the gravity vector, R is measured acceleration during a braking event, and G is the magnitude of the gravity vector.

14. A method for establishing an acceleration of a vehicle, comprising the steps of:
   establishing a gravity vector representing acceleration due to gravity;
   measuring acceleration of the vehicle in a first direction and establishing a first acceleration value;
   measuring acceleration of the vehicle in a second direction and establishing a second acceleration value, the first and second directions being perpendicular; and,
   establishing a magnitude of a horizontal component of the acceleration of the vehicle as a function of the gravity vector and the first and second acceleration values, wherein the horizontal component of the acceleration is determined by:
   $D=|G \times R|/(G^2)$, where D is the horizontal component of the acceleration, G is the gravity vector, R is measured acceleration during a braking event, and G is the magnitude of the gravity vector.

15. A method for establishing an acceleration of a vehicle, comprising the steps of:
   establishing a gravity vector representing acceleration due to gravity;
   measuring acceleration of the vehicle in a first direction and establishing a first acceleration value;
   measuring acceleration of the vehicle in a second direction and establishing a second acceleration value, the first and second directions being perpendicular; and,
   establishing a magnitude of a horizontal component of the acceleration of the vehicle as a function of the gravity vector and the first and second acceleration values, wherein the horizontal component of the acceleration is determined by:
   $D=|(Y_D \cdot X_G)-(X_D \cdot Y_G)/(G)|$, where D is the absolute value of the magnitude of the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

16. A method for establishing an acceleration of a vehicle, comprising the steps of:
   establishing a gravity vector representing acceleration due to gravity;
   measuring acceleration of the vehicle in a first direction and establishing a first acceleration value;
   measuring acceleration of the vehicle in a second direction and establishing a second acceleration value, the first and second directions being perpendicular; and,
   establishing a magnitude of a horizontal component of the acceleration of the vehicle as a function of the gravity vector and the first and second acceleration values, wherein the horizontal component of the acceleration is determined by:
   $D=|((Y_D \cdot X_G)-(X_D \cdot Y_G)/(G^2)|$, where D is the absolute value of the magnitude of the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

17. A method for establishing an acceleration of a vehicle, comprising the steps of:
   establishing a gravity vector representing acceleration due to gravity;
   measuring acceleration of the vehicle in a first direction and establishing a first acceleration value;
   measuring acceleration of the vehicle in a second direction and establishing a second acceleration value, the first and second directions being perpendicular; and,
   establishing a magnitude of a horizontal component of the acceleration of the vehicle as a function of the gravity vector and the first and second acceleration values, wherein the horizontal component of the acceleration is determined by:
   $D=((Y_D \cdot X_G)-(X_D \cdot Y_G)/(G)$, where D is the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

18. A method for establishing an acceleration of a vehicle, comprising the steps of:
   establishing a gravity vector representing acceleration due to gravity;
   measuring acceleration of the vehicle in a first direction and establishing a first acceleration value;
   measuring acceleration of the vehicle in a second direction and establishing a second acceleration value, the first and second directions being perpendicular; and,
   establishing a magnitude of a horizontal component of the acceleration of the vehicle as a function of the gravity vector and the first and second acceleration values, wherein the horizontal component of the acceleration is determined by:
   $D=((Y_D \cdot X_G)-(X_D \cdot Y_G)/(G^2)$, where D is the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

19. A system for establishing an acceleration of a vehicle, comprising:
   an accelerometer device for measuring acceleration of the vehicle in a first direction and responsively establishing a first acceleration vale and for measuring acceleration of the vehicle in a second direction and responsively establishing a second acceleration value, the first and second directions being perpendicular; and,
   a controller coupled to the accelerometer device for establishing a gravity vector representing acceleration due to gravity and for establishing a magnitude of a horizontal component of the acceleration of the vehicle as a function of the gravity vector and the first and second acceleration values, the controller for applying a first offset to the measured acceleration of the vehicle in the first direction and for applying a second offset to the measured acceleration of the vehicle in the second direction.

20. A system, as set forth in claim 19, wherein the horizontal component of the acceleration is in a plane defined by the first and second directions.

21. A system, as set forth in claim 19, the controller for determining the first and second offset values using a calibration routine.

22. A system, as set forth in claim 21, the controller for performing the calibration routine while the accelerometer device is not moving, the calibration routine including the steps of reading the first and second output signals when the accelerometer device is in a first position, rotating the accelerometer device 180 degrees to a second position, reading the first and second output signals when the accelerometer device is in the second position, and determining the first and second offset values as a function of the first and second signals read when the accelerometer device is in the first position and the first and second signals read when the accelerometer device is in the second position.

23. A system, as set forth in claim 22, wherein the accelerometer device is a two-axis device which consists of an integrated circuit that contains both x and y accelerometer functions.

24. A system, as set forth in claim 23, the calibration routine further including the step of calculating a scaling factor as a function of the first and second signals read when the accelerometer device is in the first position and the first and second signals read when the accelerometer device is in the second position.

25. A system, as set forth in claim 23, where the scaling factor is calculated using:

$$K=(X_2-X_1)^2+(Y_2-Y_1)^2)/4,$$

where K is the scaling factor, $X_1$ is the first output signal read when the accelerometer device is in the first position, $X_2$ is the first output signal read when the accelerometer device is in the second position, $Y_1$ is the second output signal read when the accelerometer device is in the first position, and $Y_2$ is the second output signal read when the accelerometer device is in the second position.

26. A system, as set forth in claim 19, the first and second offset values being determined by:

$$X_0=(X_1+X_2)/2, \text{ and}$$

$$Y_0=(Y_1+Y_2)/2,$$

where $X_0$ is the first offset value, $X_1$ is the first output signal read when the accelerometer device is in the first position, $X_2$ is the first output signal read when the accelerometer device is in the second position, $Y_0$ is the second offset value, $Y_1$ is the second output signal read when the accelerometer device is in the first position, and $Y_2$ is the second output signal read when the accelerometer device is in the second position.

27. A system, as set forth in claim 19, where the scaling factor is calculated using:

$$K=G^2,$$

where K is the scaling factor, and G is the magnitude of the gravity vector.

28. A system for establishing an acceleration of a vehicle, comprising:

an accelerometer device for measuring acceleration of the vehicle in a first direction and responsively establishing a first acceleration value and for measuring acceleration of the vehicle in a second direction and responsively establishing a second acceleration value, the first and second directions being perpendicular; and, a controller coupled to the accelerometer device for establishing a gravity vector representing acceleration due to gravity and for establishing a magnitude of a horizontal component of the acceleration of the vehicle as a function of the gravity vector and the first and second acceleration values, the controller establishing the gravity vector by (a) reading the first and second output signals, and (b) determining a new gravity vector as a function of a previous gravity vector, the first and second output signals, and a low pass filter with a second predetermined time constant.

29. A system, as set forth in claim 28, the new gravity vector having first and second components, the first and second components of the new gravity vector determined by:

$$G_X=(1-(1/A))\cdot G_{OLD\_X}+(x/A), \text{ and}$$

$$G_Y=(1-(1/A))\cdot G_{OLD\_Y}+(y/A),$$

where $G_X$ is the first component of the new gravity vector, A is a predetermined constant, $G_{OLD\_X}$ is a component of the previous gravity vector, $G_Y$ is the second component of the new gravity vector, $G_{OLD\_Y}$ is a second component of the previous gravity vector, x is the measured acceleration in the first direction and y is the measured acceleration in the second direction.

30. A system, as set forth in claim 28, the predetermined time constant being about 4 milliseconds.

31. A system for establishing an acceleration of a vehicle, comprising:

an accelerometer device for measuring acceleration of the vehicle in a first direction and responsively establishing a first acceleration value and for measuring acceleration of the vehicle in a second direction and responsively establishing a second acceleration value, the first and second directions being perpendicular; and, a controller coupled to the accelerometer device for establishing a gravity vector representing acceleration due to gravity and for establishing a magnitude of a horizontal component of the acceleration of the vehicle as a function of the gravity vector and the first and second acceleration values, wherein the horizontal component of the acceleration is determined by:

D=|G×R|/(G), where D is the horizontal component of the acceleration, G is the gravity vector, R is measured acceleration during a braking event, G×R is the cross product of vectors G and R, and G is the magnitude of the gravity vector.

32. A system for establishing an acceleration of a vehicle, comprising:

an accelerometer device for measuring acceleration of the vehicle in a first direction and responsively establishing a first acceleration value and for measuring acceleration of the vehicle in a second direction and responsively establishing a second acceleration value, the first and second directions being perpendicular; and, a controller coupled to the accelerometer device for establishing a gravity vector representing acceleration due to gravity and for establishing a magnitude of a horizontal component of the acceleration of the vehicle as a function of the gravity vector and the first and second acceleration values, wherein the horizontal component of the acceleration is determined by:

$D=|G \times R|/(G^2)$, where D is the horizontal component of the acceleration, G is the gravity vector, R is measured acceleration during a braking event, and G is the magnitude of the gravity vector.

33. A system for establishing an acceleration of a vehicle, comprising:

an accelerometer device for measuring acceleration of the vehicle in a first direction and responsively establishing a first acceleration value and for measuring acceleration of the vehicle in a second direction and responsively establishing a second acceleration value, the first and second directions being perpendicular; and, a controller coupled to the accelerometer device for establishing a gravity vector representing acceleration due to gravity and for establishing a magnitude of a horizontal component of the acceleration of the vehicle as a function of the gravity vector and the first and second acceleration values, wherein the horizontal component of the acceleration is determined by:

$D=|((Y_D \cdot X_G)-(X_D \cdot Y_G)/(G)|$, where D is the absolute value of the magnitude of the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

34. A system for establishing an acceleration of a vehicle, comprising:

an accelerometer device for measuring acceleration of the vehicle in a first direction and responsively establishing a first acceleration value and for measuring acceleration of the vehicle in a second direction and responsively establishing a second acceleration value, the first and second directions being perpendicular; and, a controller coupled to the accelerometer device for establishing a gravity vector representing acceleration due to gravity and for establishing a magnitude of a horizontal component of the acceleration of the vehicle as a function of the gravity vector and the first and second acceleration values, wherein the horizontal component of the acceleration is determined by:

$D=|((Y_D \cdot X_G)-(X_D \cdot Y_G)/(G^2)|$, where D is the absolute value of the magnitude of the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

35. A system for establishing an acceleration of a vehicle, comprising:

an accelerometer device for measuring acceleration of the vehicle in a first direction and responsively establishing a first acceleration value and for measuring acceleration of the vehicle in a second direction and responsively establishing a second acceleration value, the first and second directions being perpendicular; and, a controller coupled to the accelerometer device for establishing a gravity vector representing acceleration due to gravity and for establishing a magnitude of a horizontal component of the acceleration of the vehicle as a function of the gravity vector and the first and second acceleration values, wherein the horizontal component of the acceleration is determined by:

$D=((Y_D \cdot X_G)-(X_D \cdot Y_G)/(G)$, where D is the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

36. A system for establishing an acceleration of a vehicle, comprising:

an accelerometer device for measuring acceleration of the vehicle in a first direction and responsively establishing a first acceleration value and for measuring acceleration of the vehicle in a second direction and responsively establishing a second acceleration value, the first and second directions being perpendicular; and, a controller coupled to the accelerometer device for establishing a gravity vector representing acceleration due to gravity and for establishing a magnitude of a horizontal component of the acceleration of the vehicle as a function of the gravity vector and the first and second acceleration values, wherein the horizontal component of the acceleration is determined by:

$D=((Y_D \cdot X_G)-(X_D \cdot Y_G)/(G^2)$, where D is the horizontal component of the acceleration, $X_D$ is the measured acceleration in the first direction, $Y_D$ is the measured acceleration in the second direction, $X_G$ is a first component of the gravity vector, $Y_G$ is a second component of the gravity vector, and G is the magnitude of the gravity vector.

* * * * *

UNITED STATES PATENT AND TRADEMARK OFFICE
CERTIFICATE OF CORRECTION

PATENT NO. : 7,058,499 B2
APPLICATION NO. : 10/828756
DATED : June 6, 2006
INVENTOR(S) : Kissel Page 1 of 2

It is certified that error appears in the above-identified patent and that said Letters Patent is hereby corrected as shown below:

Column 11, line 51, delete [$D = |((Y_D \bullet X_G) - (X_D \bullet Y_G) / (G)|$] and insert therein --$D = |((Y_D \bullet X_G) - (X_D \bullet Y_G)) / (G)|$--.

Column 12, line 6, delete [$D = |((Y_D \bullet X_G) - (X_D \bullet Y_G) / (G^2)|$] and insert therein --$D = |((Y_D \bullet X_G) - (X_D \bullet Y_G)) / (G^2)|$--.

Column 12, line 27, delete [$D = ((Y_D \bullet X_G) - (X_D \bullet Y_G) / (G)$] and insert therein --$D = ((Y_D \bullet X_G) - (X_D \bullet Y_G)) / (G)$--.

Column 12, line 48, delete [$D = ((Y_D \bullet X_G) - (X_D \bullet Y_G) / (G^2)$] and insert therein --$D = ((Y_D \bullet X_G) - (X_D \bullet Y_G)) / (G^2)$--.

Column 12, line 59, after "acceleration" delete [vale] and inert therein --value--.

Column 13, line 38, delete [$K = (X_2 - X_1)^2 + (Y_2 - Y_1)^2)/4$] and insert therein --$K = ((X_2 - X_1)^2 + (Y_2 - Y_1)^2)/4$--.

Column 15, line 24, delete [$D = |((Y_D \bullet X_G) - (X_D \bullet Y_G) / (G)|$] and insert therein --$D = |((Y_D \bullet X_G) - (X_D \bullet Y_G)) / (G)|$--.

Column 15, line 46, delete [$D = |((Y_D \bullet X_G) - (X_D \bullet Y_G) / (G^2)|$] and insert therein --$D = |((Y_D \bullet X_G) - (X_D \bullet Y_G)) / (G^2)|$--.

Column 16, line 19, delete [$D = ((Y_D \bullet X_G) - (X_D \bullet Y_G) / (G)$] and insert therein --$D = ((Y_D \bullet X_G) - (X_D \bullet Y_G)) / (G)$--.

UNITED STATES PATENT AND TRADEMARK OFFICE
CERTIFICATE OF CORRECTION

PATENT NO. : 7,058,499 B2
APPLICATION NO. : 10/828756
DATED : June 6, 2006
INVENTOR(S) : Kissel It is certified that error appears in the above-identified patent and that said Letters Patent is hereby corrected as shown below:

Column 16, line 41, delete [$D = ((Y_D \bullet X_G) - (X_D \bullet Y_G) / (G^2)$] and insert therein --$D = ((Y_D \bullet X_G) - (X_D \bullet Y_G)) / (G^2)$--.

Signed and Sealed this

Twenty-second Day of August, 2006

JON W. DUDAS
*Director of the United States Patent and Trademark Office*